United States Patent
Keiser et al.

(10) Patent No.: US 10,919,283 B2
(45) Date of Patent: Feb. 16, 2021

(54) BARRIER LAYERS ON SEALING MEMBRANES

(71) Applicant: SIKA TECHNOLOGY AG, Baar (CH)

(72) Inventors: Stefan Keiser, Schwarzenberg (CH); Yannic Pironato, Sachseln (CH)

(73) Assignee: SIKA TECHNOLOGY AG, Baar (CH)

( * ) Notice: Subject to any disclaimer, the term of this patent is extended or adjusted under 35 U.S.C. 154(b) by 119 days.

(21) Appl. No.: 15/515,978

(22) PCT Filed: Sep. 24, 2015

(86) PCT No.: PCT/EP2015/072012
§ 371 (c)(1),
(2) Date: Mar. 30, 2017

(87) PCT Pub. No.: WO2016/050607
PCT Pub. Date: Apr. 7, 2016

(65) Prior Publication Data
US 2017/0297318 A1    Oct. 19, 2017

(30) Foreign Application Priority Data
Sep. 30, 2014  (EP) ................................. 14186959

(51) Int. Cl.
*B32B 7/02*       (2019.01)
*B32B 37/15*      (2006.01)
(Continued)

(52) U.S. Cl.
CPC ............ *B32B 37/15* (2013.01); *B32B 5/022* (2013.01); *B32B 5/024* (2013.01); *B32B 7/06* (2013.01);
(Continued)

(58) Field of Classification Search
CPC ........ B32B 27/08; B32B 27/32; B32B 27/34; B32B 27/36; B32B 2419/00;
(Continued)

(56) References Cited

U.S. PATENT DOCUMENTS

| | | | | |
|---|---|---|---|---|
| 5,334,659 A | * | 8/1994 | Scobbo, Jr. ............ | C08G 81/02 525/197 |
| 5,687,517 A | * | 11/1997 | Wiercinski ................ | B32B 3/28 52/177 |

(Continued)

FOREIGN PATENT DOCUMENTS

| CN | 102186664 A | 9/2011 |
|---|---|---|
| EP | 1 500 493 A1 | 1/2005 |

(Continued)

OTHER PUBLICATIONS

Kanai et al., Film Processing, 1999, Hanser/Gardner Publishers, pp. 236-237 (Year: 1999).*

(Continued)

*Primary Examiner* — Prashant J Khatri
*Assistant Examiner* — Zachary M Davis
(74) *Attorney, Agent, or Firm* — Oliff PLC

(57) ABSTRACT

A sealing membrane including: a) a thermoplastic polyolefin membrane and b) a barrier film including b1) a barrier layer including at least one polymer selected from ethylene-vinyl alcohol copolymer, polyamide or polyester and b2) an outer layer, wherein the barrier film is laminated over the full surface area or over part of the surface area onto the polyolefin membrane, and so the outer layer is connected directly to the polyolefin membrane, and the outer layer and the polyolefin membrane are both ethylene-based or the outer layer and the polyolefin membrane are both propylene-based. The sealing membrane can be produced at low cost and has a stable interconnecting bond. It is suitable in particular for sealing in building construction or civil engineering work.

14 Claims, 1 Drawing Sheet

(51) Int. Cl.
| | |
|---|---|
| *B32B 7/12* | (2006.01) |
| *B32B 27/32* | (2006.01) |
| *B32B 27/36* | (2006.01) |
| *B32B 27/30* | (2006.01) |
| *B32B 5/02* | (2006.01) |
| *B32B 27/20* | (2006.01) |
| *B32B 27/18* | (2006.01) |
| *B32B 27/12* | (2006.01) |
| *B32B 27/34* | (2006.01) |
| *B32B 27/10* | (2006.01) |
| *B32B 27/08* | (2006.01) |
| *B32B 7/06* | (2019.01) |
| *B32B 37/06* | (2006.01) |
| *B32B 37/12* | (2006.01) |

(52) U.S. Cl.
CPC ............... *B32B 7/12* (2013.01); *B32B 27/08* (2013.01); *B32B 27/10* (2013.01); *B32B 27/12* (2013.01); *B32B 27/18* (2013.01); *B32B 27/20* (2013.01); *B32B 27/306* (2013.01); *B32B 27/32* (2013.01); *B32B 27/34* (2013.01); *B32B 27/36* (2013.01); *B32B 37/06* (2013.01); *B32B 37/12* (2013.01); *B32B 27/327* (2013.01); *B32B 2260/021* (2013.01); *B32B 2260/046* (2013.01); *B32B 2262/0253* (2013.01); *B32B 2262/0276* (2013.01); *B32B 2270/00* (2013.01); *B32B 2307/748* (2013.01); *B32B 2309/105* (2013.01); *B32B 2419/00* (2013.01)

(58) Field of Classification Search
CPC ....... B32B 2419/06; E04B 1/62; E04B 1/625; E04B 1/64; E04B 1/66; E04B 1/665; E04D 5/00; E04D 5/06; E04D 5/10
See application file for complete search history.

(56) References Cited

U.S. PATENT DOCUMENTS

| | | | |
|---|---|---|---|
| 5,824,401 A | 10/1998 | Jenkins et al. | |
| 2004/0109985 A1* | 6/2004 | Furst | B32B 11/04 428/156 |
| 2011/0052852 A1* | 3/2011 | Samanta | E04D 5/10 428/40.3 |
| 2011/0197427 A1 | 8/2011 | Weber et al. | |
| 2013/0052386 A1 | 2/2013 | Slongo et al. | |
| 2014/0248466 A1 | 9/2014 | Rudolf et al. | |
| 2015/0231863 A1 | 8/2015 | Knebel et al. | |

FOREIGN PATENT DOCUMENTS

| | | |
|---|---|---|
| EP | 2 299 005 A1 | 3/2011 |
| WO | 2014/029763 A1 | 2/2014 |

OTHER PUBLICATIONS

Properties of Polyolefins, https://polymerdatabase.conn/polymer%20classes/Polyolefin%20type.html, accessed Feb. 23, 2019 (Year: 2019).*

Aug. 7, 2018 Office Action issued in Chinese Patent Application No. 201580052973.2.

Apr. 4, 2017 International Preliminary Report on Patentability issued in International Patent Application No. PCT/EP2015/072012.

Nov. 19, 2015 International Search Report issued in International Patent Application No. PCT/EP2015/072012.

Apr. 12, 2019 Office Action issued in Chinese Patent Application No. 201580052973.2.

Apr. 4, 2019 Office Action issued in European Patent Application No. 15 767 502.6.

Mar. 2, 2020 Office Action issued in Chinese Patent Application No. 201580052973.2.

Sep. 27, 2019 Office Action issued in Chinese Patent Application No. 201580052973.2.

* cited by examiner

BARRIER LAYERS ON SEALING MEMBRANES

TECHNICAL FIELD

The invention relates to membranes for sealing systems which can be used in construction and in civil engineering.

PRIOR ART

In sealing systems using membranes there are various layers adjacent to one another in direct contact. Because of possible migration phenomena, compatibility of said layers with one another is often problematic.

By way of example, if a flexible PVC membrane is in contact with EPS thermal insulation, a glass nonwoven separator has to be placed therebetween in order to prevent the plasticizer from the membrane from migrating into the expanded polystyrene (EPS) and thus causing collapse of the foam structure of the EPS thermal insulation. The PVC would moreover lose flexibility through loss of plasticizer.

TPO membranes are membranes based on olefin-based thermoplastic elastomers (TPO). If a TPO membrane is in contact with an (old) bituminous sealing system, a felt separator has to be placed therebetween in order to prevent substances from the bitumen from migrating into the TPO and thus discoloring the membrane and greatly impairing its UV resistance.

In particular in the case of membrane structures using adhesive layers, migration phenomena have been found to have a decisive effect on the performance of a sealing system. By way of example, large quantities of plasticizer can migrate from the membrane into the adhesive (especially when flexible PVC is used), or conversely adhesive constituents can also migrate into the membrane. This is in particular observed in the case of contact between polyolefin membranes and hotmelt adhesives and bituminous adhesives. The change of composition often alters the properties of the membranes, and also of the adhesives, to an extent that can impair functionality.

The following problems are therefore in particular encountered in these systems:
- loss of plasticizer from plasticized PVC impairs the mechanical properties of the membrane
- absorption of adhesive constituents greatly impairs the UV resistance/ageing resistance of the TPO membrane
- loss of adhesive constituents leads to defective adhesive properties
- absorption of large quantities of plasticizer in the adhesive can also lead to unacceptable change of adhesive properties.

Systems comprising barrier layers are described for eliminating these disadvantages: EP 1500493 A1 describes a colored, weldable multilayer sealing sheet which comprises a weldable colored polymer layer which is colorfast and weathering-resistant, a nonmetallic barrier layer and a bitumen layer, and also optionally one or more layers selected from flame-retardant layers, protective layers, adhesion-promoter layers and supportive layers, where the nonmetallic barrier layer is arranged between the colored polymer layer and the bitumen layer.

However, the processes for producing these systems with barrier layers are complicated because they require additional coating steps and/or use of adhesive layers or adhesion-promoter layers. This significantly increases production costs.

It is also sometimes not possible to achieve long-lasting bonding of the barrier layers to the membranes. By way of example, inadequate adhesion in water can sometimes cause said layers to separate from the membrane. Coating of polyolefins is generally difficult, and this additionally exacerbates the problems for polyolefin membranes. Lacquering of membranes with a barrier layer moreover requires additional production equipment.

US 2011/0197427 A1 relates to a waterproof membrane with a barrier layer, a composite layer and, situated therebetween, a sealing means which is applied in the manner of a mesh and which is preferably an acrylate compound, a polyurethane polymer, a silane-terminated polymer or a polyolefin.

EP 2299005 A1 relates to a waterproof membrane with a partitioning layer and a contact layer made of a contact provider and an adhesion provider, where adhesion provider bonds the contact provider to the partitioning layer.

U.S. Pat. No. 5,824,401 describes a water-impermeable membrane for surfaces of buildings which comprise a bituminous adhesive membrane and at least three polymer layers thereabove, of which one can be oil-resistant.

WO 2014/029763 A1 relates to a waterproof membrane for concrete with a partitioning layer and a functional layer made of a contact provider and an adhesion provider, where adhesion provider bonds the contact provider to the partitioning layer.

DESCRIPTION OF THE INVENTION

The object of the invention consisted in the provision of sealing systems with membranes for construction and civil engineering which eliminate the prior-art difficulties discussed above. Another intention here was to provide sealing systems which, because of incompatibility between materials, could not be realized hitherto.

A particular intention is to permit production of sealing membranes in combination with bitumen or hotmelt-based self-adhesive compositions, with the aim of providing low-cost self-adhesive membranes for sealing systems.

The intention was to achieve as stable and long-lasting adhesion for the barrier layers to the membrane. A further intention was to permit production of the sealing membranes by a process which is simple and therefore inexpensive.

Surprisingly, it has been found that this object could be achieved by using, for the construction of barrier layers for sealing membranes, packaging films which are conventional in the packaging industry and have a barrier layer; packaging films selected here have an external layer made of material compatible with the material of the membrane. These packaging films, which are per se conventional and inexpensive, can be laminated directly onto the membrane in a simple manner when the membrane is produced on an extrusion line, to give the sealing membrane of the invention. Optional application of a pressure-sensitive-adhesive layer can be achieved in conventional manner.

The invention therefore provides a sealing membrane comprising a) a thermoplastic polyolefin membrane comprising at least one polymer selected from ethylene homopolymer, ethylene copolymer, propylene homopolymer or propylene copolymer, and b) a barrier film comprising b1) a barrier layer comprising at least one polymer selected from ethylene-vinyl alcohol copolymer, polyamide or polyester, and b2) an outer layer comprising at least one polymer selected form ethylene homopolymer, ethylene copolymer, propylene homopolymer or propylene copolymer, where the barrier layer has been laminated to all or part of the surface of the polyolefin membrane in a manner that gives direct bonding between the polyolefin membrane and the outer layer of the barrier film, and both the outer layer and the polyolefin membrane are ethylene-based or both the outer layer and the polyolefin membrane are propylene-based.

By virtue of the sealing membrane of the invention it is surprisingly possible to avoid use of more complicated barrier designs in the structure of the system. There is no need to provide expensive coating apparatus. The structure permits simplified production of the sealing membrane and use of low-cost hotmelt PSA adhesives to provide self-adhesive sealing systems with a significantly better price-to-performance ratio. The significantly improved compatibility between the materials moreover gives better long-term performance, not only in relation to the adhesion of the adhesive but also in relation to the long-term behavior of the sealing membrane.

It was particularly surprising that, despite the barrier layer, the sealing membranes of the invention can still be welded by conventional thermal welding equipment, e.g. by manual welding equipment from Leister. Although the multilayer films are very thin, the layer structure is not damaged during lamination and welding. The entire area of the polyolefin layers is held in place at all times, and at no time does the intervening barrier material have any adverse effect on bonding.

The invention also provides a process for the production of the sealing membrane, and use of said membrane, as defined in the other independent claims. The dependent claims describe preferred embodiments.

METHOD FOR THE IMPLEMENTATION OF THE INVENTION

Figure 1:
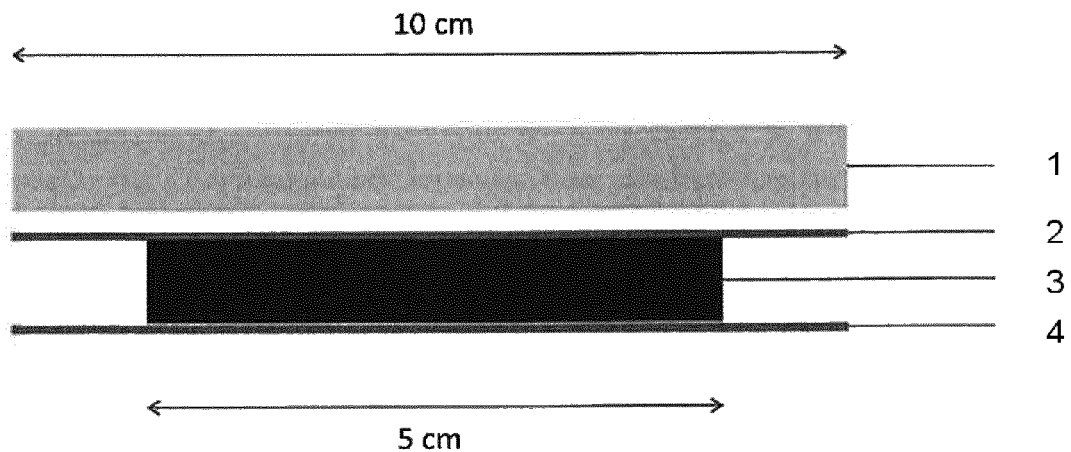
FIGS. 1 and 2 are diagrams of the experimental setup for determining migration in sealing systems.

The thermoplastic polyolefin membrane, the barrier layer and the outer layer in particular involve plastics layers formed from a polymer or from a mixture or two or more polymers. Each of the layers can optionally comprise, as is conventional in industry, one or more additives, selected by way of example from lubricants, heat stabilizers, ageing inhibitors and light stabilizers, antioxidants, antistatic agents, conductive agents, flame retardants, colorants, for example pigments, plasticizers, flexibilizers, fillers and reinforcing materials.

The sealing membrane comprises a) a thermoplastic polyolefin membrane comprising at least one polymer selected from ethylene homopolymer, ethylene copolymer, propylene homopolymer or propylene copolymer. The thermoplastic polyolefin membrane can comprise one polymer or a blend of two or more polymers.

The thermoplastic polyolefin membrane preferably comprises, based on the total weight of the thermoplastic polyolefin membrane, at least 40% by weight of at least one polymer selected from ethylene homopolymer, ethylene copolymer, propylene homopolymer or propylene copolymer. The thermoplastic polyolefin membrane preferably comprises, based on the total weight of the thermoplastic polyolefin membrane, up to 60% by weight of fillers and additives.

The thermoplastic polyolefin membrane preferably comprises, based on the total weight of the thermoplastic polyolefin membrane, from 70 to 99% by weight of at least one polymer selected from ethylene homopolymer, ethylene copolymer, propylene homopolymer or propylene copolymer, in particular from 80 to 98% by weight. The thermoplastic polyolefin membrane preferably comprises, based on the total weight of the thermoplastic polyolefin membrane, from 1 to 30% by weight of fillers and additives, more preferably from 2 to 20% by weight.

It is preferable that the at least one polymer selected from ethylene homopolymer, ethylene copolymer, propylene homopolymer or propylene copolymer for the thermoplastic polyolefin membrane is at least one polymer selected from high-density polyethylene (HDPE), medium-density polyethylene (MDPE), low-density polyethylene (LDPE), polyethylene (PE), polypropylene (PP), ethylene-vinyl acetate copolymer (EVA), ethylene-n-alkene copolymer or propylene-n-alkene copolymer, for example in particular ethylene-propylene copolymer (EPM) or ethylene-propylene-diene copolymer (EPDM). The n-alkene can by way of example be an α-olefin having from 3 to 12 C atoms, e.g. propene, butene or octene.

The thermoplastic polyolefin membrane preferably comprises, based on the total weight of the thermoplastic polyolefin membrane, at least 40% by weight of at least one of the abovementioned polymers. The thermoplastic polyolefin membrane preferably comprises, based on the total weight of the thermoplastic polyolefin membrane, from 70 to 99% by weight of at least one of the abovementioned polymers, in particular from 80 to 98% by weight.

The thermoplastic polyolefin membrane is preferably a TPO membrane, i.e. a membrane which comprises olefin-based thermoplastic elastomer. Olefin-based thermoplastic elastomers can be composed of the abovementioned ethylene homopolymers, ethylene copolymers, propylene homopolymers, propylene copolymers or a mixture thereof.

The thermoplastic polyolefin membrane is an ethylene-based or propylene-based polyolefin membrane, in particular an ethylene-based or propylene-based polyolefin membrane which comprises olefin-based thermoplastic elastomer.

The expression ethylene copolymers means copolymers which comprise ethylene units. The expression propylene copolymers means copolymers which comprise propylene units. Copolymers which comprise not only ethylene units but also propylene units are ethylene copolymers here when the proportion by weight of ethylene units is greater than the proportion by weight of propylene units, and respectively are propylene copolymers when the proportion by weight of propylene units is greater than the proportion by weight of ethylene units. It is preferable that the proportion of ethylene units in ethylene copolymers is more than 50% by weight and that the proportion of propylene units in propylene copolymers is more than 50% by weight.

In ethylene-based thermoplastic polyolefin membranes the proportion by weight of ethylene homopolymers and/or ethylene copolymers is more than 50% by weight, based on the total weight of the polymers in the polyolefin membrane. In propylene-based thermoplastic polyolefin membranes the proportion by weight of propylene homopolymers and/or propylene copolymers is more than 50% by weight, based on the total weight of the polymers in the polyolefin membrane.

Thermoplastic polyolefin membranes are used for sealing systems in construction and civil engineering and are obtainable commercially, for example as Sarnafil® or Sikaplan® from Sika, these being ethylene-based or propylene-based polyolefin membranes.

The thickness of the thermoplastic polyolefin membrane is preferably in the range from 0.1 to 10 mm, in particular from 0.5 to 3 mm.

The thermoplastic polyolefin membrane can optionally comprise one or more additives inclusive of fillers. Examples of additives have been mentioned above. The thermoplastic polyolefin membrane optionally comprises by way of example at least one additive selected from flame retardants, pigments, stabilizers, in particular UV stabilizers, antioxidants or fillers.

The thermoplastic polyolefin membrane can have one or more layers. It is preferable that the thermoplastic polyolefin membrane has one or two layers. However, it is also possible by way of example that a thermoplastic polyolefin membrane has three or four layers. In the case of membranes having two or more layers, the polymer composition in all of the layers can be identical or different.

In the case of a two-layer thermoplastic polyolefin membrane it is possible by way of example that the exterior layer optionally comprises pigments and/or UV stabilizers and that the interior layer optionally comprises color pigments such as carbon black. The exterior layer of the thermoplastic polyolefin membrane in the sealing membrane of the invention here is the layer that faces away from the barrier film. The interior layer in the sealing membrane of the invention is correspondingly the layer bonded to the outer layer of the barrier film.

The thermoplastic polyolefin membrane can moreover optionally comprise a supportive element. The supportive element contributes to the dimensional stability of the membrane. This is preferably a fiber material or a mesh, in particular a fiber material. The supportive element is ignored for the purposes of the polymers mentioned above and the stated quantities thereof in the membrane.

The expression fiber material means a material composed of fibers. The fibers comprise or consist of inorganic or synthetic material. In particular, these are inorganic fibers, for example glass fibers. Synthetic fibers that may be mentioned are especially preferably fibers made of polyester or made of a homo- or copolymer of ethylene and/or propylene or of viscose. The fibers here can be short fibers or long fibers, or spun, woven or unwoven fibers or filaments. The supportive element composed of fibers can by way of example be a woven fabric, laid scrim or knitted fabric. A particularly preferred fiber material is a nonwoven or a laid scrim.

It is preferable that the supportive element has been incorporated into the membrane. The supportive element moreover advantageously has interstices which at least to some extent have been penetrated by the material of the membrane. This contributes to good bonding of membrane to supportive element.

The barrier film comprises a barrier layer and an outer layer. The barrier layer comprises at least one polymer selected from ethylene-vinyl alcohol copolymer (EVOH), polyamide (PA) or polyester. Examples of polyamides are PA 66 made of hexamethylenediamine and adipic acid, PA 610 made of hexamethylenediamine and sebacic acid, PA 6 made of caprolactam or aminoundecanoic acid, PA 11 made of undecanolactam or PA 12 made of laurolactam or am inododecanoic acid. Examples of polyesters are polyethylene erephthalate (PET), polybutylene terephthalate (PBT) and polyethylene naphthalate (PEN). The barrier layer preferably comprises EVOH or PA.

The barrier film can comprise one barrier layer or two or more identical or different barrier layers, an example being one PA layer and one EVOH layer. However, one barrier layer is generally entirely sufficient for the solution desired here.

The outer layer of the barrier film comprises at least one polymer selected from ethylene homopolymer, ethylene copolymer, propylene homopolymer or propylene copolymer.

The ethylene homopolymer, ethylene copolymer, propylene homopolymer or propylene copolymer for the outer layer of the barrier film is preferably at least one polymer selected from high-density polyethylene (HDPE), medium-density polyethylene (MDPE), low-density polyethylene (LDPE), polyethylene (PE), polypropylene (PP), ethylene-vinyl acetate copolymer (EVA), maleic-anhydride-grafted polyethylene or maleic-anhydride-grafted polypropylene.

The outer layer of the barrier film is ethylene-based or propylene-based, where the definition applicable here is the same as that for the thermoplastic polyolefin membrane, i.e. the proportion by weight of ethylene homopolymers and/or ethylene copolymers in the ethylene-based outer layer, based on the total weight of the polymers in the outer layer, is more than 50% by weight, and the proportion by weight of propylene homopolymers and/or propylene copolymers in the propylene-based outer layer, based on the total weight of the polymers in the outer layer, is more than 50% by weight.

The outer layer of the barrier film is in particular a thermoplastic layer. At room temperature (23° C.) the outer layer is solid and non-adhesive. The outer layer is in particular a heat-sealable outer layer.

It is preferable that at least one polymer comprised in the outer layer has a lower melting point than a polymer comprised in the polyolefin membrane. The melting point of polymers can be determined by means of dynamic scanning calorimetry (DSC). Blends of two or more polymers can be present in the respective layers, and the layers can accordingly exhibit two or more melting points.

The outer layer can optionally comprise one or more additives. Examples of additives have been mentioned above.

These barriers films are widely used as packaging films. A wide variety of these barriers films are therefore obtainable commercially and can be used for the present invention. The thickness of the barrier film is preferably in the range from 30 to 130 µm, in particular from 40 to 60 µm. The thickness of the outer layer of the barrier film can by way of example be from 10 to 60 µm, preferably from 15 to 25 µm.

The barrier film is preferably a blown film, in particular a multilayer blown film. However, the barrier film can also by way of example have been formed by adhesive lamination or by coextrusion.

The barrier film can have two or more layers, in particular from 2 to 5 layers, and 5-layer barrier films are particularly suitable here. As explained above, it is also optionally possible that two or more barrier layers are present. The barrier film can also optionally comprise two outer layers as defined above of identical or different composition as respective exterior layer on the two sides, and this is also generally preferred. Other optional layers that can be present in the barrier film are by way of example one or more adhesion-promoter layers.

Adhesion-promoter layers are intervening layers intended for the bonding of two layers. This is frequently necessary when the layers to be bonded have little compatibility. For some layer embodiments there can be a need for an adhesion-promoter layer by way of example between the outer layer and the barrier layer. However, there can be direct bonding between outer layer and barrier layer.

Bonding of the barrier layer, e.g. an EVOH layer or PA layer, to the outer layer in the barrier film can preferably be ensured by way of an adhesion-promoter layer (Tie layer). Materials often used here, in particular in the multilayer blown-film-extrusion process, are anhydride-modified polyolefins, e.g. maleic-anhydride-grafted polyethylene or maleic-anhydride-grafted polypropylene.

Supportive layers are by way of example made of polyester, polypropylene, polyvinyl chloride, polyamide, polyethylene or polystyrene. In contrast to the outer layers, the supportive layers are generally not heat-sealable.

Examples of the structure of the barrier film made of barrier layer (BL), outer layer (OL), and also optionally adhesion-promoter layer (AP) and/or supportive layer are:
2-layer: OL/BL
3-layer: OL/AP/BL; OL/BL/OL; OL/BL/SL
4-layer: OL/AP/BL/OL; OL/AP/BL/SL
5-layer: OL/AP/BL/AP/OL; OL/AP/BL/AP/SL In the sealing membrane of the invention the barrier film has been laminated onto the thermoplastic polyolefin membrane in a manner that gives direct bonding between the polyolefin membrane and the outer layer of the barrier film. The expression "direct bonding" means that there is no other layer or substance present between the polyolefin membrane and the outer layer of the barrier film, and that the polyolefin membrane and the outer layer adhere to one another. At the boundary between two materials it is possible that the two materials are present in a mixture with one another.

Bonding between the barrier film and the thermoplastic polyolefin membrane by way of the heat-sealable outer layer is thus achieved in particular by way of thermal lamination. This is less expensive than lamination using an adhesive, and bonds achieved between barrier film and thermoplastic polyolefin membrane are moreover more stable and more water-resistant.

The outer layer and, respectively, the barrier film can have been laminated to all or part of the surface of the thermoplastic polyolefin membrane, preference being given here to lamination to all of the surface. In the case of lamination to part of the surface, only parts of the polyolefin membrane have been laminated, in any desired pattern, to the barrier film.

An example of lamination to part of the surface is lamination of two barrier films respectively to the two peripheral regions of the thermoplastic polyolefin membrane in longitudinal direction. This can by way of example be advantageous when the sealing membranes are laid out alongside one another with overlap in conventional manner for the sealing of surfaces, and adhesive bonding is desired only in the overlapping regions.

The outer layer of the barrier film, which permits coherent bonding to the thermoplastic polyolefin membrane, has to be specifically appropriate to the polymer or, respectively, the polymer mixture of the membrane. Barrier films with ethylene-based outer layer are therefore used when the thermoplastic polyolefin membrane to be coated is an ethylene-based membrane. On the other hand, barrier films with propylene-based outer layer are used when the thermoplastic polyolefin membrane to be coated is a propylene-based membrane. Appropriate compatibility between the layers is thus achieved. The barrier films can then be laminated directly to the product during the process for producing the thermoplastic polyolefin membrane, in particular TPO membrane.

Corresponding films with ethylene- or propylene-based outer layers which are suitable for lamination to ethylene-based and, respectively, propylene-based membranes are obtainable by way of example from Huhtamaki.

The sealing membrane can optionally and preferably moreover comprise an adhesive layer. The location of the adhesive layer is on the barrier film and specifically on that side of the barrier film that is opposite to that side of the barrier film on which the thermoplastic polyolefin membrane has been bonded.

The adhesive for the adhesive layer can be any desired adhesive conventionally used in this sector. The adhesive is preferably a pressure-sensitive adhesive. The adhesive, in particular the pressure-sensitive adhesive, of the adhesive layer is preferably selected from a bitumen adhesive, a hotmelt adhesive, in particular a hotmelt PSA adhesive, or a heat-activatable hotmelt adhesive, or a rubber adhesive. PSA means "pressure sensitive adhesive". Particularly suitable bitumen adhesives are called cold-self-adhesive bitumen adhesives.

The adhesive can be applied to the barrier film by way of familiar processes. In particular when the adhesive layer is made of a pressure-sensitive adhesive, it is preferable, as is conventional, to apply a release liner on the external side of the adhesive layer. Another term used for a release liner is release paper or release film.

The sealing membrane of the invention can by way of example be produced as roll, conventional widths being by way of example from 1 to 2 m, and indeed in some cases up to 3 m, as is conventional for sealing sheets. The sealing membranes of the invention can be laid directly onto substrates where it would otherwise be necessary to use a separate barrier layer.

Specific preferred embodiments of the sealing membrane are listed below:

a) ethylene copolymer in the form of ethylene-based membrane, entire surface applied by extrusion to a barrier film with LDPE outer layer and EVOH barrier layer or PA barrier layer, with bituminous adhesive applied to all of the surface b) ethylene copolymer in the form of ethylene-based membrane, entire surface applied by extrusion to a barrier film with LDPE outer layer and EVOH barrier layer or PA barrier layer, with hotmelt PSA adhesive applied to all of the surface c) ethylene copolymer in the form of ethylene-based membrane, entire surface applied by extrusion to a barrier film with LDPE outer layer and EVOH barrier layer or PA barrier layer, with rubber adhesive (e.g. SikaLastomer® or butyl) applied to all of the surface d) ethylene copolymer in the form of ethylene-based membrane, entire surface applied by extrusion to a barrier film with LDPE outer layer and EVOH barrier layer or PA barrier layer, with heat-activatable hotmelt adhesive applied to all of the surface e) ethylene copolymer in the form of ethylene-based membrane, extruded in the region of overlap onto a barrier film with LDPE outer layer and EVOH barrier layer or PA barrier layer with hotmelt PSA adhesive applied in the region of overlap f) PP blend in the form of propylene-based membrane, entire surface applied by extrusion to a barrier film with PP outer layer and PA barrier layer or EVOH barrier layer, with bituminous adhesive applied to all of the surface g) PP blend in the form of propylene-based membrane, entire surface applied by extrusion to a barrier film with PP outer layer and PA barrier layer or EVOH barrier layer, with hotmelt PSA adhesive applied to all of the surface h) PP blend in the form of propylene-based membrane, entire surface applied by extrusion to a barrier film with PP outer layer and PA barrier layer or EVOH barrier layer, with rubber adhesive (e.g. SikaLastomer® or butyl) applied to all of the surface i) PP blend in the form of propylene-based membrane, entire surface applied by extrusion to a barrier film with PP outer layer and PA barrier layer or EVOH barrier layer, with heat-activatable hotmelt adhesive applied to all of the surface j) PP blend in the form of propylene-based membrane, entire surface applied by extrusion to a barrier film with PP outer layer and PA barrier layer or EVOH barrier layer.

It would also be possible to use, instead of one barrier layer, mixed forms with a larger number of barrier layers.

The sealing membrane of the invention can be produced in a simple manner directly during the production of the thermoplastic polyolefin membrane, by applying the shaped melt of the polyolefin membrane, obtained by extrusion, directly to the outer layer of the barrier film, the bond here preferably being subjected to pressure. Energy introduced from the shaped melt melts the heat-sealable material of the outer layer and thus, after cooling, bonds the membrane to the barrier film.

Surprisingly, multilayer barrier films selected in accordance with above criteria could be bonded directly to the main membrane in the polishing stack of the extrusion line during the extrusion process, without creasing and without break-off of the thin film as a result of heat-shock. The heat from the plastics melt is sufficient for fusion with the outer layer of the barrier film, and the resultant bond to the actual membrane is durably robust.

Lamination can advantageously be achieved in the polishing stack or the calender of the extrusion system. The barrier film can be heated prior to, during or after application of the shaped melt of the membrane, preferably prior to or during application. This is particularly advantageous when a propylene-based membrane and a propylene-based outer layer are bonded to one another, because the propylene-based layers have relatively high melting points, and the energy introduced from the shaped melt is therefore generally not sufficient. A suitable heating method uses heatable polishing-stack rolls of the extrusion system.

The invention accordingly also provides a process for the production of a sealing membrane as described above, where the material for the thermoplastic polyolefin membrane is extruded, preferably through a slot die, and in the polishing stack of the extrusion line, in particular at the first polishing-stack roll, the extruded shaped melt is applied to the outer layer of the barrier film and thus bonded thereto, preferably under pressure.

The barrier film can be heated prior to, during or after, preferably prior to or during, application of the shaped melt, in particular when propylene-based polyolefin membranes and outer layers are used.

The sealing membrane of the invention is particularly suitable for sealing in construction and civil engineering.

Examples

Bitumen Migration Tests

The following films were tested as barrier film:

LDPE-EVOH film Huhtamaki 73942, thickness 60 µm; film comprising two LDPE outer layers and intervening EVOH layer PP-PA film Huhtamaki 74975, thickness 100 µm; film comprising two PP outer layers and intervening PA layer PP-PA release liner Huhtamaki, thickness 25 µm; film comprising two PP outer layers and intervening PA layer, where one outer layer has been siliconized LDPE film PP film BOPP film Biaxially oriented polypropylene The following were tested as thermoplastic polyolefin membranes:

PE membrane ethylene-based TPO membrane, thickness 0.5 mm

PP membrane propylene-based TPO membrane, thickness 0.5 mm

The barrier property of the films was tested by, as depicted in FIG. 1, placing a 10 cm×10 cm sample of the film to be tested between the membrane and a 5 cm×5 cm bitumen adhesive sample, and determining mass transfer. One test was carried out with no film between these materials. The arrangement was maintained for one week at 70° C., and change of mass was then determined. For metrological reasons the bitumen sample was selected to be sufficiently small to avoid full adhesive bonding of the samples under the test conditions (since bitumen flows easily), because otherwise it would be impossible to determine quantitative change of mass.

The bitumen adhesive is a cold-self-adhesive formulation from FAIST ChemTec.

The table below presents absolute mass transfer (mass afterward minus mass beforehand) for the membrane (mass increase) and the bitumen adhesive (mass decrease).

Membrane mass increase/Bitumen adhesive mass decrease (all data in grams)

| | PE membrane | | PP membrane | |
| --- | --- | --- | --- | --- |
| Barrier | PE membrane mass increase | Bitumen mass decrease | PP membrane mass increase | Bitumen mass decrease |
| None | 0.2340 | — | 0.3471 | — |
| LDPE film | 0.1033 | −0.1066 | 0.1908 | −0.1944 |
| PP film | 0.1612 | −0.1630 | 0.1881 | −0.1901 |
| BOPP film | 0.0213 | −0.0218 | 0.0491 | −0.0459 |
| LDPE-EVOH film | −0.0027 | −0.0012 | −0.0002 | 0.0000 |
| PP-PA film | −0.0028 | −0.0043 | −0.0017 | −0.0042 |
| PP-PA release liner | −0.0027 | 0.0003 | −0.0028 | 0.0003 |

It can be seen that migration can be suppressed by use of a barrier film used in the invention.

Hotmelt Adhesives Migration Test

Figure 2:
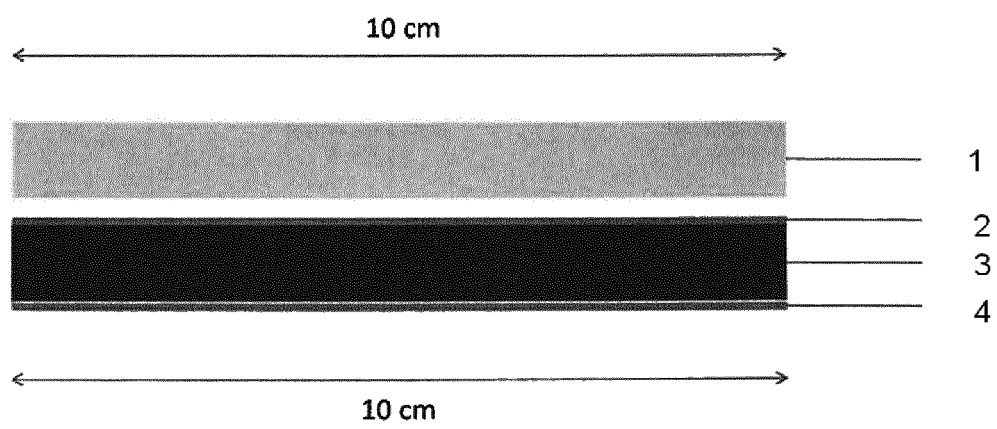

Somewhat larger adhesive samples were selected for the test using hotmelt adhesive. The hotmelt adhesive does not flow as easily as bitumen. In other respects, the test was carried out in the same way as the bitumen migration test, and mass transfer was determined. The tests used 600 g/m² of the hotmelt adhesive SikaMelt® 9209HT from Sika. FIG. 2 depicts the test arrangement.

Film types and membranes tested were the same as in the bitumen test. An experimental film from Huhtamaki was also tested, this likewise being a modified PP-PA multilayer film.

The table below presents absolute mass transfer (mass afterward minus mass beforehand) for the membrane (mass increase) and the hotmelt adhesive (mass decrease).

Membrane mass increase/Hotmelt adhesive mass decrease (all data in grams)

| Barrier | PE membrane | | PP membrane | |
| --- | --- | --- | --- | --- |
| | PE membrane mass increase | Hotmelt mass decrease | PP membrane mass increase | Hotmelt mass decrease |
| None | 0.1324 | — | 0.3012 | — |
| LDPE film | 0.1524 | −0.1572 | 0.3060 | −0.3135 |
| PP film | 0.2593 | −0.2649 | 0.4263 | −0.4299 |
| BOPP film | 0.0582 | −0.0635 | 0.1045 | −0.1045 |
| LDPE-EVOH film | −0.0018 | −0.0031 | 0.0029 | 0.0052 |
| PP-PA film | −0.0027 | −0.0068 | 0.0037 | −0.0080 |
| PP-PA release liner | −0.0016 | −0.0030 | 0.0066 | −0.0099 |
| PP-PA experimental film | −0.0028 | −0.0240 | −0.0012 | −0.0070 |

It was found that the films with EVOH barrier or PA barrier also provide an excellent barrier in respect of hotmelt adhesive.

Production Example 1

A sealing membrane was produced from an LDPE-EVOH film and an ethylene-based polyolefin membrane (PE membrane). The film and the membrane correspond to those used above in the migration tests. Here, the material for the PE membrane was extruded at a temperature of about 180° C., and the LDPE-EVOH film was bonded to the extruded shaped melt of the PE membrane in the polishing stack of the extrusion line. The heat from the plastics melt is sufficient for fusion with the outer layer of the barrier film, and the resultant bond to the polyolefin membrane is durably robust.

Because the melting point of the LDPE is relatively low, the barrier film can be subjected to only slight preheating. The bank of molten plastic in the polishing stack must be kept small, and said bank is intended to rotate onto the film in order that this is immediately fixed and no creases can form by virtue of the susceptibility of the barrier to shrinkage. A sealing membrane 1 was thus produced.

Production Example 2

A sealing membrane was produced from an PP-PA film (experimental film from Huhtamaki) and a propylene-based polyolefin membrane (PE membrane). The film and the membrane correspond to those used above in the migration tests. Here, the material for the PP membrane was extruded at a temperature of about 190° C., and the PP-PA film (experimental film from Huhtamaki) was bonded to the extruded shaped melt of the PP membrane in the polishing stack of the extrusion line.

Because the melting point of the PP outer layer of the barrier film is high, the barrier film was subjected to a relatively high level of preheating on the first polishing-stack roll. The roll temperature was about 80° C. Because the film has good heat resistance, this is not problematic, and permits good adhesion.

Here again, the bank of molten plastic is intended to be small and to be adjusted so as to rotate onto the film. It has been found that the high level of preheating of the barrier film also reduces the stresses arising through cooling between the film and the melt, and that it is thus possible substantially to prevent bowing of the membrane. A sealing membrane 2 was thus produced.

Properties of Sealing Membranes 1 and 2

Surprisingly, despite the barrier layer, the resultant membranes 1 and 2 can still be welded by conventional heat-welding equipment, e.g. with manual welding equipment from LEISTER. Although the multilayer films are very thin, the layer structure is not damaged during lamination and welding. The entire area of the polyolefin layers is held in place at all times, and at no time does the intervening barrier material have any adverse effect on bonding.

Sealing membrane 1 was stored in water at 60° C. for one year, and thereafter retained an excellent bond.

Sealing membrane 2 was stored in water at 60° C. for six months and thereafter exhibited no separate phenomena of any kind.

Comparative Example

A PET film and a flexible PVC membrane were bonded to one another with an acrylate lamination adhesive or PU lamination adhesive. This bond obtained with a lamination adhesive exhibited inadequate water-resistance. After storage in water at 60° C. for as little as 8 weeks, separation phenomena were apparent.

Thermal bonding appropriate to the materials is significantly preferable to lamination with lamination adhesives not only because costs for application of lamination adhesive are higher but also for reasons of performance (long lasting, very good adhesion).

KEY

1 Thermoplastic polyolefin membrane
2 Barrier film
3 Adhesive layer
4 Release liner

What is claimed is:
1. A sealing membrane comprising:
   a) a thermoplastic polyolefin membrane comprising at least one polymer selected from the group consisting of ethylene homopolymer, ethylene copolymer, propylene homopolymer, and propylene copolymer; and
   b) a barrier film comprising:
      b1) a barrier layer comprising at least one polymer selected from the group consisting of ethylene-vinyl alcohol copolymer, polyamide, and polyester; and
      b2) an outer layer comprising at least one polymer selected from the group consisting of ethylene homopolymer, ethylene copolymer, propylene homopolymer, and propylene copolymer,
   wherein the barrier film is laminated to all or part of a surface of the thermoplastic polyolefin membrane in a manner that gives direct bonding between the thermoplastic polyolefin membrane and the outer layer of the barrier film,
   both the outer layer and the thermoplastic polyolefin membrane are ethylene-based or both the outer layer and the thermoplastic polyolefin membrane are propyl- ene-based, where the proportion by weight of at least one of ethylene homopolymers and ethylene copolymers in an ethylene-based thermoplastic polyolefin membrane or outer layer is more than 50% by weight, based on the total weight of the polymers in the ethylene-based thermoplastic polyolefin membrane and outer layer, respectively, and, in a propylene-based thermoplastic polyolefin membrane or outer layer, the proportion by weight of at least one of propylene homopolymers and propylene copolymers is more than 50% by weight, based on the total weight of the polymers in the propylene-based thermoplastic polyolefin membrane and outer layer, respectively, a layer thickness of the thermoplastic polyolefin membrane is in a range of 0.5 to 3 mm, a layer thickness of the barrier film is in a range of 30 to 130 μm, and a layer thickness of the outer layer of the barrier film is in a range of 10 to 60 μm.

2. The sealing membrane as claimed in claim 1, further comprising an adhesive layer arranged on a side of the barrier film that is opposite to a side of the barrier film on which the thermoplastic polyolefin membrane is present, wherein an optional release liner is arranged on an external side of the adhesive layer.

3. The sealing membrane as claimed in claim 2, wherein an adhesive of the adhesive layer is selected from the group consisting of a bitumen adhesive, a hotmelt adhesive, and a rubber adhesive.

4. The sealing membrane as claimed in claim 1, wherein the barrier film is a blown film.

5. The sealing membrane as claimed in claim 1, wherein the thermoplastic polyolefin membrane further comprises an olefin-based thermoplastic elastomer.

6. The sealing membrane as claimed in claim 1, wherein the thermoplastic polyolefin membrane has one or more layers, and optionally comprises at least one additive selected from the group consisting of flame retardants, pigments, stabilizers, antioxidants, and fillers.

7. The sealing membrane as claimed in claim 1, wherein the barrier film comprises two or more layers.

8. The sealing membrane as claimed in claim 1, wherein the thermoplastic polyolefin membrane comprises at least one polymer selected from the group consisting of high-density polyethylene (HDPE), medium-density polyethylene (MDPE), low-density polyethylene (LDPE), polyethylene (PE), polypropylene (PP), Ethylene-vinyl acetate copolymer (EVA), ethylene-n-alkene copolymer, propylene-n-alkene copolymer, ethylene-propylene copolymer (EPM), and ethylene-propylene-diene copolymer (EPDM).

9. The sealing membrane as claimed in claim 1, wherein the outer layer of the barrier film comprises at least one polymer selected from the group consisting of high-density polyethylene (HDPE), medium-density polyethylene (MDPE), low-density polyethylene (LDPE), polyethylene (PE), polypropylene (PP), ethylene-vinyl acetate copolymer (EVA), maleic-anhydride-grafted polyethylene, and maleic-anhydride-grafted polypropylene.

10. The sealing membrane as claimed in claim 1, wherein the sealing membrane is the ethylene-based thermoplastic polyolefin membrane comprising ethylene copolymer, a barrier film comprising an ethylene-vinyl alcohol copolymer (EVOH) barrier layer or polyamide (PA) barrier layer and an LDPE outer layer, and an adhesive layer made of an adhesive selected from the group consisting of bitumen adhesive, hotmelt pressure sensitive adhesive (PSA) adhesive, heat-activatable hotmelt adhesive, and rubber adhesive, where the barrier film and the adhesive layer are arranged on all of a surface of the ethylene-based thermoplastic polyolefin membrane or on peripheral regions thereof, or the sealing membrane is the propylene-based thermoplastic polyolefin membrane comprising polypropylene, a barrier film comprising an EVOH barrier layer or PA barrier layer and a PP outer layer, and optionally an adhesive layer made of an adhesive selected from the group consisting of bitumen adhesive, hotmelt PSA adhesive, heat-activatable hotmelt adhesive, and rubber adhesive, where the barrier film and optionally the adhesive layer are arranged on all of the surface of the propylene-based thermoplastic polyolefin membrane.

11. The sealing membrane as claimed in claim 1, wherein at least one polymer comprised in the outer layer has a lower melting point than a polymer comprised in the thermoplastic polyolefin membrane.

12. The sealing membrane as claimed in claim 1, wherein the thermoplastic polyolefin membrane is a polypropylene-based membrane and the outer layer is a polypropylene-based layer.

13. A process for the production of a sealing membrane as claimed in claim 1, wherein a material for the thermoplastic polyolefin membrane is extruded in an extrusion system, and, in a polishing stack of the extrusion system, an extruded shaped melt is applied to the outer layer of the barrier film and thus bonded thereto.

14. The process as claimed in claim 13, wherein the barrier film is heated prior to or during application of the shaped melt.

* * * * *